Oct. 7, 1969   R. FRITZWEILER ET AL   3,471,131
CONTINUOUS MIXING APPARATUS

Filed July 26, 1966   3 Sheets-Sheet 1

INVENTORS
RUPPRECHT FRITZWEILER
JOSEPH HECKMAIER
BY FERDINAND GERSTNER
HANS WIMMER
HEINZ WINKLER

D. Malcolm
ATTORNEY

Oct. 7, 1969  R. FRITZWEILER ET AL  3,471,131

CONTINUOUS MIXING APPARATUS

Filed July 26, 1966  3 Sheets-Sheet 2

INVENTORS
RUPPRECHT FRITZWEILER
JOSEPH HECKMAIER
BY FERDINAND GERSTNER
HANS WIMMER
HEINZ WINKLER

D. Malcolm
ATTORNEY

United States Patent Office 3,471,131
Patented Oct. 7, 1969

3,471,131
CONTINUOUS MIXING APPARATUS
Rupprecht Fritzweiler, Joseph Heckmaier, Ferdinand Gerstner, Hans Wimmer, and Heinz Winkler, Burghausen, Upper Bavaria, Germany, assignors to Wacker-Chemie G.m.b.H., Munich, Germany
Filed July 26, 1966, Ser. No. 567,947
Claims priority, application Germany, July 26, 1965, W 39,621
Int. Cl. B01f 7/28, 15/02
U.S. Cl. 259—8　　　　　　　　　　　　　　　　2 Claims

ABSTRACT OF THE DISCLOSURE

In carrying out the invention a deformable mixture of materials is fed forward in the form of a continuous sleeve, through an apparatus which continuously deforms the inner and outer cylindrical surfaces of said sleeve while maintaining the core of said sleeve undamaged.

---

Figure 1:
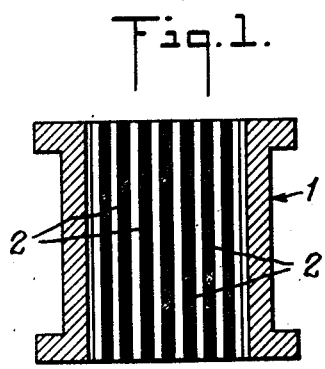

This invention relates to mixing flowable, deformable materials of various kinds, and it has for its object to provide a novel and improved apparatus for this purpose.

Another object of the invention is to provide a novel means for continuously and uniformly mixing materials of the above type at high speeds, without interruption, and without damage to the materials or clogging of the mixing apparatus.

Various designs of rotating cone mixing devices are known which, by appropriate arrangement and configuration of ribs or burls on cone-shaped rotor or stator parts, produce kneading, shearing and stretching effects in the materials to be mixed, at high peripheral velocities. These cone mixers have the common characteristic that the stream of the product is cone-shaped. Due to this shape it receives a continuous increase of the mass acceleration in the direction of passage, and this results in an uneven mixing intensity.

Also known are devices for continuously mixing liquids in a cylindrical rotating mixer. The rotor inside a cylindrical housing has, for instance, axially intermittent cylindrical section with diameters smaller than the diameter of the housing. In these areas of the mixer the cylindrical housing as well as the cylindrical rotor have smooth surfaces. In the other sections the rotor's outside diameter is substantially equal to the inside diameter of the housing. Thereby the mixing of the product stream is continuously subject to multiple interruptions. Moreover, in the zones of less turbulence, i.e., where the surfaces of the housing and the rotor are smooth and the mixing volume is greatest, no intensive mixing can be obtained. In the case of difficult components even disintegration is quite possible in these areas and these chambers might cause a clogging of the mixer in the case of reaction-prone mixtures and of mixtures tending to heap up.

Also known are multiple edge mixers where the product stream has multiple edges. The chamber-like cross section is such case causes deposite or disintegration.

We have now discovered a novel method for continuously mixing flowable, deformable substances which may be capable of reacting, and which preferably are highly viscous, in a concentric-cylinder rotating mixer. Our invention is characterized by the fact that a product stream shaped like a cylindrical sheath or sleeve, and produced by any suitable propelling means, is continusouly deformed on the inside and the outside, keeping the core or interior of the cylindrical product stream unaffected. It is possible with this method to achieve a maximum and even mixing effect from the beginning to the end of the mixing process. Moreover, by maintaining the cylindrical shape of the product stream during the mixing operation the harmful decomposition of molecules in polymers and the accumulation of substances in dead spaces is prevented.

The deformation that is caused by the shape of the surfaces of the rotor and stator is simultaneous with an axial propulsion of the sleeve-like stream in such a manner that the propulsion is caused either by the rotor or by the stator. However, it is also possible to obtain the deformation from both sides without any populsion effect, in which case the propulsion of the cylindrical stream of materials is effected by outside pressure.

When carrying out our method it has been found to be useful to feed the individual components of the product stream into the rotating mixer at various different points, as hereinafter described. Also, the product stream can be heated or cooled through the stator and/or through the rotor.

Figure 8:
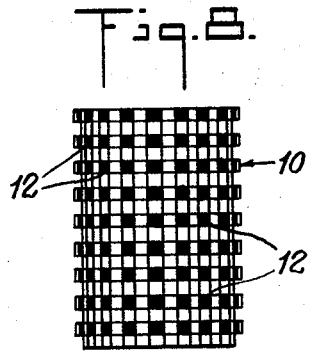
Figure 9:
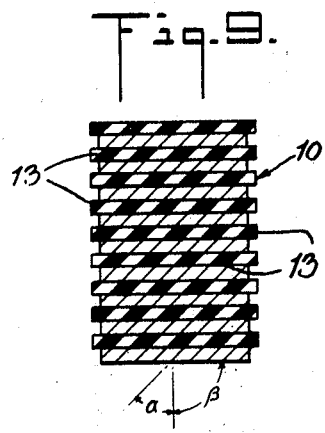
Figure 10:
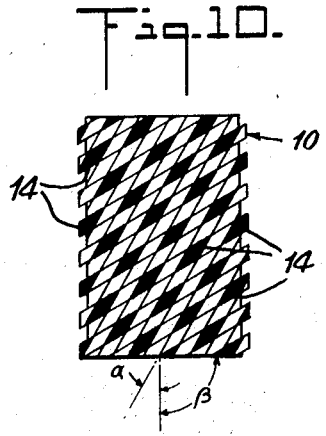
Figure 11:
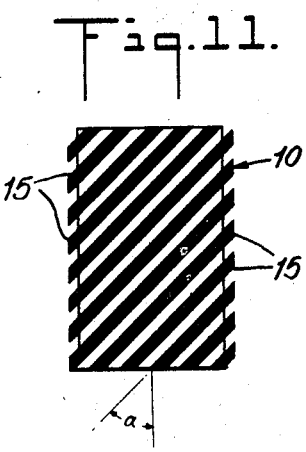
Figure 12:
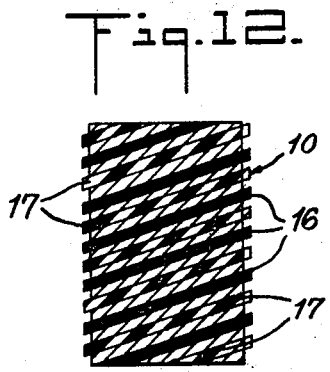
Figure 13:
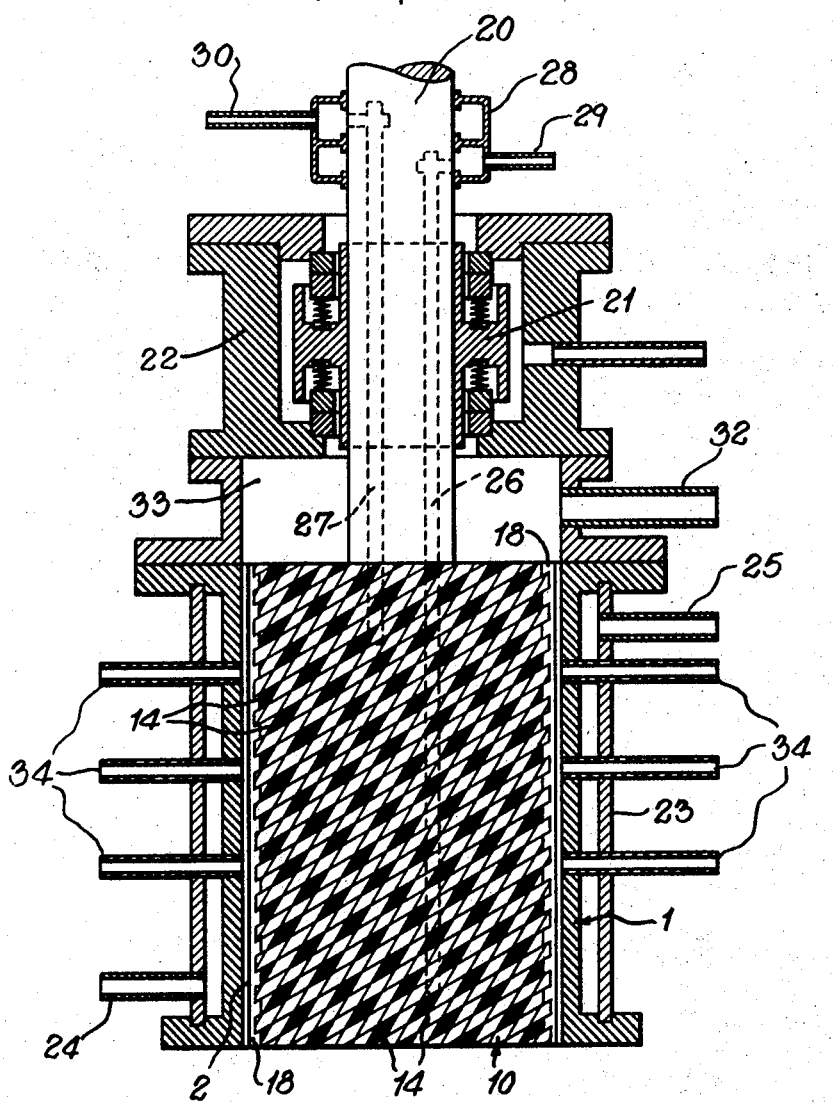

The invention is described in connection with the accompanying drawings which show various diagrammatic arrangements of apparatus for carrying out the invention, and in which:

FIGS. 1 to 6, inclusive, are diagrammatic views showing cylindrically stators having different arrangements of protuberances, such as ribs or burls, on the inner cylindrical surface;

FIGS. 7 to 12, inclusive, are diagrammatic views showing cylindrical rotors having different arrangements of protuberances, such as ribs or burls, on the outer cylindrical surface; and FIG. 13 is a diagrammatic view of a mixing apparatus embodying the invention, which, by way of illustration, contains the stator of FIG. 1 and the rotor of FIG. 10.

Figure 2:
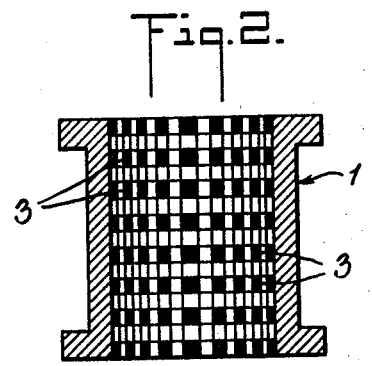

In FIG. 1, the inner cylindrical surface of the stator 1 is formed with longitudinally or axially arranged parallel ribs 2; while in FIG. 2 the stator 1 has its inner cylindrical surface formed with peripherally and axially spaced burls or nubs 3.

Figure 3:
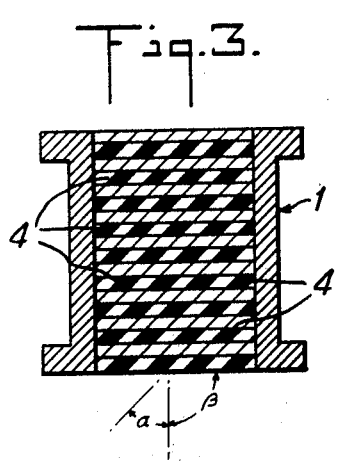
Figure 4:
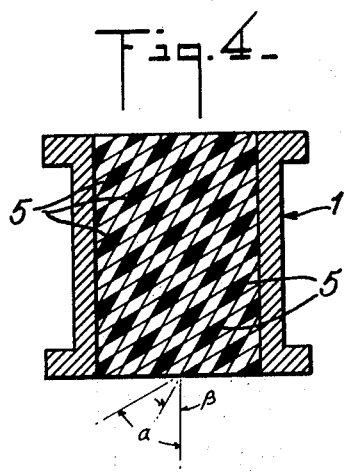

In FIG. 3 the inner cylindrical surface of stator 1 is formed with helically arranged series of nubs 4; while FIG. 4 shows another arrangement of helically arranged diamond-shaped nubs 5.

Figure 5:
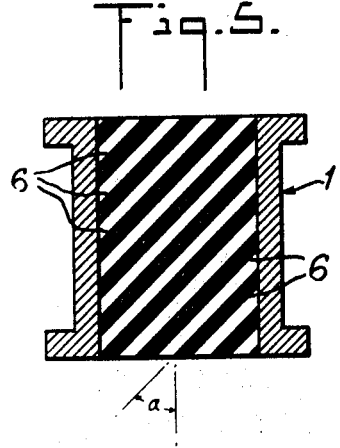
Figure 6:
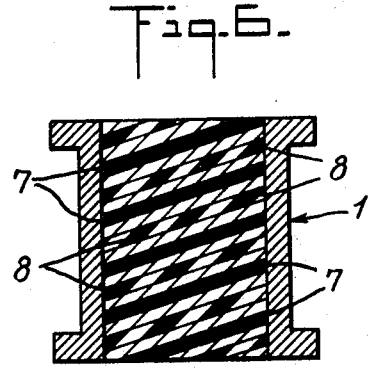

In FIG. 5 the inner cylindrical surface of stator 1 has protuberances in the form of helically arranged ribs 6; while in FIG. 6 helical ribs 7 alternate with helically arranged diamond-shaped nubs 8.

In the case of the helically arranged ribs or burls, the angle of slope $\alpha$ of the helix is preferably 15 to 30°, and the angle $\beta$ of the rib or burl flank is preferably about 45 to 60°. This also applies in the case of the rotors hereinafter described.

Figure 7:
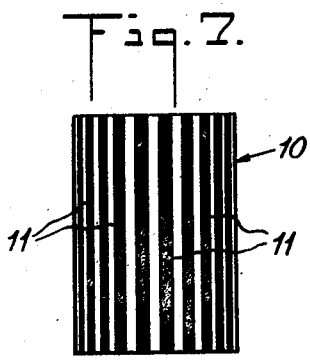

The cylindrical rotor 10 shown in FIG. 7 has longitudinally or axially arranged parallel ribs 11, while in FIG. 8 the rotor 10 has its outer cylindrical surface formed with radially disposed spaced burls or nubs 12.

In FIG. 9 the outer cylindrical surface of rotor 10 has nubs 13 comparable with the nubs 4 of the stator shown in FIG. 3; while FIG. 10 shows the rotor 10 as having spaced helically arranged diamond-shaped nubs 14 comparable with the nubs 5 of the stator shown in FIG. 4.

In FIG. 11 the outer cylindrical surface of the rotor 10 has spaced helically arranged ribs 15; while in FIG. 12 helically arranged ribs 16 alternate with helically arranged diamond-shaped nubs 17.

For purposes of illustration the mixing apparatus illustrated diagrammatically in FIG. 13 employs the stator 1 having longitudinal ribs 2 as in FIG. 1, and the inner concentric rotor 10 having diamond-shaped nubs 14 as in FIG. 10.

With the parts so assembled, there is an annular slit or gap 18 between the highest nubs 14 of rotor 10 and the longitudinal ribs 2 of stator 1. The width of this annular gap 18 is adapted to the consistency and mixability of the product to be mixed. Such width should not exceed, as a rule, the height of the protuberances (i.e., the ribs or nubs) but in special cases it can be extended.

In FIG. 13 the rotor 10 is carried by a rotatable shaft 20 mounted in a suitable bushing 21 within casing 22. The stator 1 is surrounded by a jacket 23 for the circulation of a heating or cooling fluid which may enter through pipe 24 and leave through pipe 25. If desired, the product stream can also be heated or cooled through the rotor 10 the hollow interior of which may contain fluid inlet and outlet ducts 26 and 27, respectively, which extend downwardly through shaft 20 and are connected through a suitable coupling 28 with fluid inlet and outlet pipes 29 and 30, respectively.

The substance forming the product stream is fed through conduit 32 into a chamber 33 communicating with the top of the annular gap 18 between the stator and rotor. If desired, said substance may be fed through conduit 32 under pressure. Feeder pipes or nozzles 34 may be arranged axially at intervals in stator 1, communicating with the annular gap 18 as illustrated, for the purpose of feeding materials into the product stream in any desired sequence. The advantage of this arrangement is that the various components are homogeneously dispersed in the mixture as quickly as possible which, for instance, guarantees the even consistency of reaction mixtures.

By the novel arrangement and shaping of the stator and rotor surfaces as described above, the homogenizing effect on the product, as it moves forward, is improved. Moreover, the result is an excellent kneading and stretching effect of the mixed product. For especially sensitive products undesirable shearing forces can be eliminated by using rounded ribs or burls.

The construction of the ribs or burls can be selected in such a manner that they also perform a propulsion effect in an axial direction, in addition to the homogenizing affect. Depending on the task to be performed, constructions as per FIGS. 1 to 12 for use in cylindrical rotating mixers can be combined in many ways. For instance, in cases where no additional axial propulsion is required, the stators as per FIGS. 1 and 2 may be combined with the rotors as per FIGS. 7 and 8.

If an additional propulsion effect in an axial direction is desired, and intensive pushing and stretching effects in the mixed substance are required, one can choose combinations of the stators as per FIGS. 3, 4, 5 and 6 with rotors as per FIGS. 9, 10, 11 and 12.

This prevents clogging of the rotor or the stator by residues. Also the result is a relief of pressure on the shaft packing on the drive side. The axial propulsion effect is further influenced by the choice of the angle of inclination of the ribs or burls.

The distance between the ribs or burls radially or axially is preferably equal to or greater than the thickness of the ribs or burls.

In an axial direction the stator ribs or burls run exactly axially, or helically. The profile base of the stator ribs or burls may be the same as the profile head, or preferably the base may be 1.5 to 2 times wider than the profile head. In most cases the preferred depth of the profile is equal to one-half of the gradation in a circumferential direction.

The length and diameter proportion of the rotor and stator depends on the required stay periods of the mixed substance, and it depends primarily on the throughput. By using variable drive rotational speeds the throughput in an existing mixer can be adjusted within limits.

The method of operation of the invention may be carried out without pressure as well as under pressure, and it can also be incorporated into a closed pipeline system, the material to be mixed entering continuously through conduit 32 (and pipes 34) and the mixed end product, in the form of a continuous cylindrical sleeve, emerging at the lower end of the machine and being thence conveyed by any suitable means for further processing or use.

On principle our apparatus can be used for mixing all flowable substances. Its preferred use, however, is in difficult cases, as for instance for highly viscous to paste-like substances whose chemical structure is delicate, or which have a tendency to clog. The mixing may have many purposes, for instance homogenizing, emulsifying, dispersion, precipitating, carrying out a chemical reaction, dissolving, extraction, or gasifying liquids.

EXAMPLE 1

A 40% polyvinyl acetate solution in methanol is fed into the mixer through pipe 32 (FIG. 13). The design of the mixer is a combination of the rotor 10 of FIG. 10 and the stator 1 of FIG. 1. Through a pipe or pipes 34 a methanolic sodium methylate solution with a content of 2½% sodium methylate is continuously fed as a catalyst into the product stream and admixed homogeneously by the motion of the rotor. The reaction mixture emerging from the mixer solidifies after a short while, containing polyvinyl alcohol. The degree of hydrolysis of the resulting polyvinyl alcohol remains constant and depends on the proportion of the polyvinyl acetate to the sodium methylate used.

In a mixer with a rotor diameter of 80 mm., a rotor and stator length of 220 mm. and a gap (18) width of 1 mm. the throughput per hour is 1700 l./hour at 3000 r.p.m., 200 l. thereof consisting of the catalyst solution.

EXAMPLE 2

A 10% aqueous polyvinyl alcohol solution with a hydrolysis degree of about 80% is continuously fed into the mixer through pipe 32. Through one or more pipes 34 vinyl acetate is continuously added to the product stream. The result is a homogeneous and extremely stable emulsion of vinyl acetate in a polyvinyl alcohol solution.

EXAMPLE 3

A soft resin-like mixed polymerizate consisting of 70 parts vinyl acetate and 30 parts vinyl laurate is fed in a melted state into the mixer through a pipe 34 and admixed with a stream of water which is fed in through pipe 32. The impurities soluble in water are extracted from the polymerizate. The result is a tasteless product which is therefore highly suitable for chewing gum.

The invention claimed is:

1. A continuous mixing apparatus comprising a pair of concentric cylindrical surfaces at least one of which is rotatable with respect to the other, and which have a cylindrical space between them for the passage of a sleeve-like mixture of materials, and a plurality of protuberances on said cylindrical surfaces projecting into said cylindrical space to agitate the inner and outer cylindrical surfaces of the sleeve-like mixture of materials passing through said space, the height of said protuberances being limited to leave a gap within which said mixture of materials is not reached by said protuberances, the protuberances on the rotatable surface having diamond-shaped outer faces bounded by substantially radially projecting edge faces, leading and adjoining ones of said edge faces on each protuberance being sloped to propel said sleeve-like mixture of materials in a single generally axial direction through said cylindrical space corresponding to a given direction of rotation.

2. Apparatus according to claim 1, in which the protuberances on at least one of said concentric cylindrical surfaces are arranged helically, and in which the angles of the slope of the said leading and adjoining edge faces on each protuberance with respect to the axis of said one of said concentric cylindrical surfaces are respectively 15°–30° and 45°–60°.

References Cited

UNITED STATES PATENTS

| | | |
|---|---|---|
| 2,345,086 | 3/1944 | Becker et al. |
| 2,714,744 | 8/1955 | Becker. |
| 2,674,104 | 4/1954 | Street. |
| 2,788,953 | 4/1957 | Schneider _____ 259—4 |
| 2,857,144 | 10/1958 | Gurley et al. _____ 259—8 XR |
| 2,965,362 | 12/1960 | Flottmann et al. _____ 259—8 |
| 2,969,960 | 1/1961 | Gurley _____ 259—7 |
| 2,970,817 | 2/1961 | Gurley _____ 259—7 |
| 3,012,977 | 12/1961 | Wilson et al. _____ 259—7 XR |
| 3,111,389 | 11/1963 | Hansen et al. _____ 259—7 XR |

FOREIGN PATENTS 226,770   2/1960   Australia.

WALTER A. SCHEEL, Primary Examiner

JOHN M. BELL, Assistant Examiner

U.S. Cl. X.R.

18—14; 241—260